July 11, 1950
R. N. FELTON ET AL
2,514,483
FISH STRINGER
Filed Jan. 10, 1947
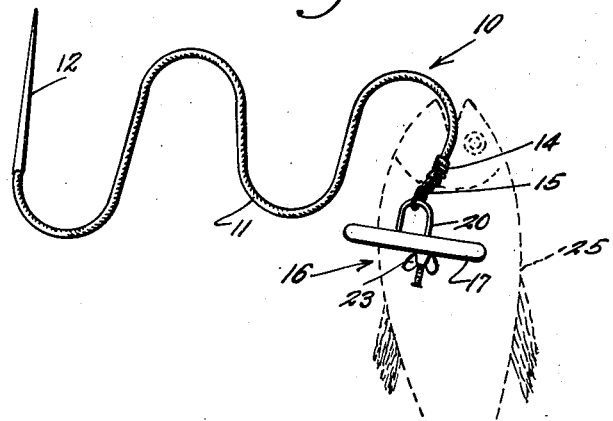
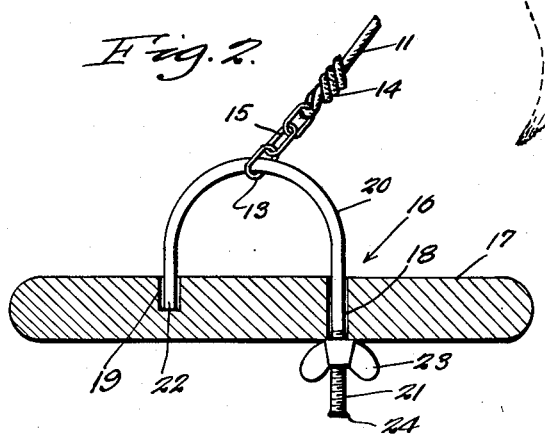
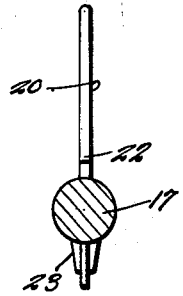
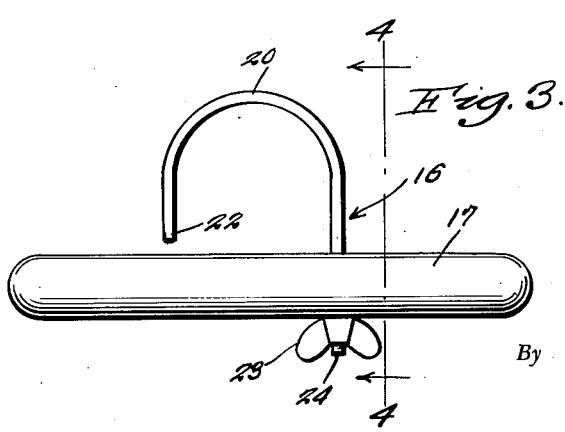
Inventor
RAY N. FELTON
RALPH LUKE
By Clarence A. O'Brien
and Harvey B. Jacobson
Attorneys Patented July 11, 1950

2,514,483

UNITED STATES PATENT OFFICE 2,514,483

FISH STRINGER

Ray N. Felton and Ralph Luke,
South St. Paul, Minn.

Application January 10, 1947, Serial No. 721,310

1 Claim. (Cl. 224—7)

This invention relates to new and useful improvements and structural refinements in fish stringers, and the principal object of the invention is to provide a device of the character herein described, from which the fish may be easily and quickly removed.

A further object of the invention is to provide a fish stringer which is simple in construction, convenient in use, and which will readily lend itself to economical manufacture.

Another object of the invention is to provide a fish stringer which will not easily become damaged and which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which:

Figure 1 is a perspective view of the invention.

Figure 2 is a cross sectional view of a keeper used in the same.

Figure 3 is a side elevational view of the subject shown in Figure 2, and

Figure 4 is a cross sectional view, taken substantially in the plane of the line 4—4 in Figure 3.

Like characters of reference are used to designate like parts in the specification and throughout the several views.

Referring now to the accompanying drawings in detail, the invention consists of a fish stringer designated generally by the reference character 10, the same embodying in its construction a flexible element such as a length of cord 11, provided at one end thereof with a pointed extremity, as exemplified by the needle 12.

The remaining end of the cord 11 is equipped with a loop 13, this being facilitated by tying the ends of the cord as at 14 to a short length of chain 15, the link at the free end of the chain constituting the aforementioned loop 13, as will be clearly apparent from the accompanying Figure 2.

The essence of the invention resides in the provision of a keeper designated generally by the reference character 16 which consists of a bar 17 formed with a transversely extending bore 18 and with a blind aperture 19.

A substantially J-shaped hook 20, provided at the end of its relatively long arm with a screw-threaded portion 21 has the long arm thereof slidably and rotatably positioned in the bore 18, while the end portion 22 of its relatively short arm is removably receivable in the aperture 19.

The wing nut 23 is provided on the screw-threaded portion 21 of the hook 20 and the free extremity of the screw-threaded portion is flared outwardly as indicated at 24, whereby removal of the nut 23 is prevented.

The eye 13 associated with the cord 11 is removably receivable on the hook 20 as shown in Figure 2, and when the invention is placed in use, the fish hook may be strung on the cord 11 in the conventional, well-known manner, as indicated by phantom lines 25 in Figure 1.

In this instance, the end portion 22 of the hook 20 is disposed in the aperture 19 of the bar 17 and the nut 23 is tightened so as to prevent disengagement of the end portion 22, as will be clearly apparent. In this manner, the loop 13 will be retained on the hook 20 and the fish will be prevented from sliding off the stringer cord 11.

However, when it is desired to remove the fish, it is only necessary to loosen the nut 23, whereupon the hook 20 may be slid and rotated so as to disengage the portion 22 from the aperture 19. The loop 13 may then be separated from the hook 20 and the fish may be easily and quickly removed from the stringer cord.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What we claim as our invention is:

In a fish stringer, a holder comprising a bar formed with a transverse bore and with a blind aperture adjacent said bore, a stringer cord engaging hook having a J-shaped configuration and including a relatively long arm and a relatively short arm, said long arm extending slidably and rotatably through said bore and having a screw-threaded end portion, an end portion of said short arm being receivable in said aperture to prevent rotation of said hook in said bore, and a clamping nut on the screw-threaded portion of said long arm, whereby the end portion of said short arm may be retained in said aperture.

RAY N. FELTON.
RALPH LUKE.

REFERENCES CITED

The following references are of record in the file of this patent:

UNITED STATES PATENTS

| Number | Name | Date |
| --- | --- | --- |
| 331,715 | Jacobus | Dec. 1, 1885 |
| 927,840 | Dineen | July 13, 1909 |
| 1,423,203 | Fiske | July 18, 1922 |